United States Patent [19]

Mitsui

[11] Patent Number: 4,478,456

[45] Date of Patent: Oct. 23, 1984

[54] MEANS FOR ADJUSTABLY SUPPORTING HEADREST OF AUTOMOTIVE SEAT

[75] Inventor: Hideo Mitsui, Fuchushi, Japan

[73] Assignee: Tokyo Seat Kabushiki-Kaisha, Asakashi, Japan

[21] Appl. No.: 285,856

[22] Filed: Jul. 22, 1981

[30] Foreign Application Priority Data

Jul. 25, 1980 [JP]  Japan .......................... 55-105784[U]

[51] Int. Cl.³ .............................................. A47C 1/10
[52] U.S. Cl. .................................... 297/410; 248/407
[58] Field of Search ............. 297/397, 405, 391, 410; 248/408, 409, 407, 423; 108/146

[56] References Cited

U.S. PATENT DOCUMENTS

| | | | |
|---|---|---|---|
| 2,741,370 | 4/1956 | Dills | 108/146 |
| 3,512,832 | 5/1970 | Kage | 248/408 X |
| 3,512,833 | 5/1970 | Sugiura | 248/408 |
| 3,542,429 | 11/1970 | Inoue | 248/408 X |
| 3,563,602 | 2/1971 | Ohta | 297/410 |
| 3,979,150 | 9/1976 | Elzenbeck | 297/410 |

Primary Examiner—James T. McCall
Attorney, Agent, or Firm—Browdy and Neimark

[57] ABSTRACT

Means for removably connecting and vertically adjustably supporting a headrest to an automotive seat. Detent mechanisms of said means which engage with a base member of the headrest for fixing the headrest at a desired elevation are accommodated to those parts of the means which are substantially over the upper end of the automotive seat, and are easily accessible for their assembly or dismantle.

1 Claim, 8 Drawing Figures

MEANS FOR ADJUSTABLY SUPPORTING HEADREST OF AUTOMOTIVE SEAT

DETAILED DESCRIPTION OF THE INVENTION

This invention relates to means for supporting a headrest vertically adjustably to an automotive seat.

It is known to fit a headrest to an automotive seat so that the former is adjustable in its vertical position with respect to the latter.

In such known devices or means for supporting the headrest, or more particularly its base or shank portion to the automotive seat, a detent member which engages with the selected one of recesses of said base or shank portion for fixing the headrest at a desired elevation, is embeddedly or fixedly assembled in the means, or the detent means is assembled into those parts of devices which are insertedly fitted in the automotive seat. This kind of arrangement makes the devices complicated, and also makes the assembly or reassembly or dismantle operation complex.

In view of the above, this invention is to provide means for removably connecting a headrest to an automotive seat, which is simple in its construction and easy for its assembly, dismantle, and reassembly, and which is characterized by the following features:

(a) a vertically extending hollow body being provided with a flange which extends transversely to and outwardly from an upper part of the body;

(b) a base part of the head rest being slidably received by the hollow body;

(c) recesses provided circumferentially to the base part of the headrest and with a predetermined distance therebetween along the slidable direction of the base part, each of the recesses having a surface of a right angle with respect to the slidable direction;

(d) detent means provided to the hollow body which is biased toward the base part of headrest and which engages resiliently with a selected one of the recesses;

(e) the detent means having generally a U-shape in its plan view and being horizontally linear in its side view and provided with a base portion and bifurcations extending from the base portion;

(f) the base portion being insertedly accommodated within a slot opening provided to the flange of the hollow body, and the bifurcations extending outwardly from the hollow body and transversely to the longitudinal axis of the hollow body; and (g) spring means accommodated within the slot opening so as to resiliently press the detent means against the base part of headrest.

The connecting and supporting means made in accordance with this invention can optionally comprise a push button which is provided to the flange and operable to release the resilient engagement of the detent means with the base part of headrest. Further, the surface provided to each recesses of the above feature (c) at a right angle with respect to the slidable direction of the base part shall be an upper surface of each of the recesses in case they are located other than at the lowermost, and shall be a lower surface in case the recess is located at the lowermost.

In the accompanying drawing in which a preferred embodiment of this invention is illustrated:

With reference to the accompanying drawing, a headrest for an automotive seat made in accordance with this invention is further explained hereinunder.

Figure 1:
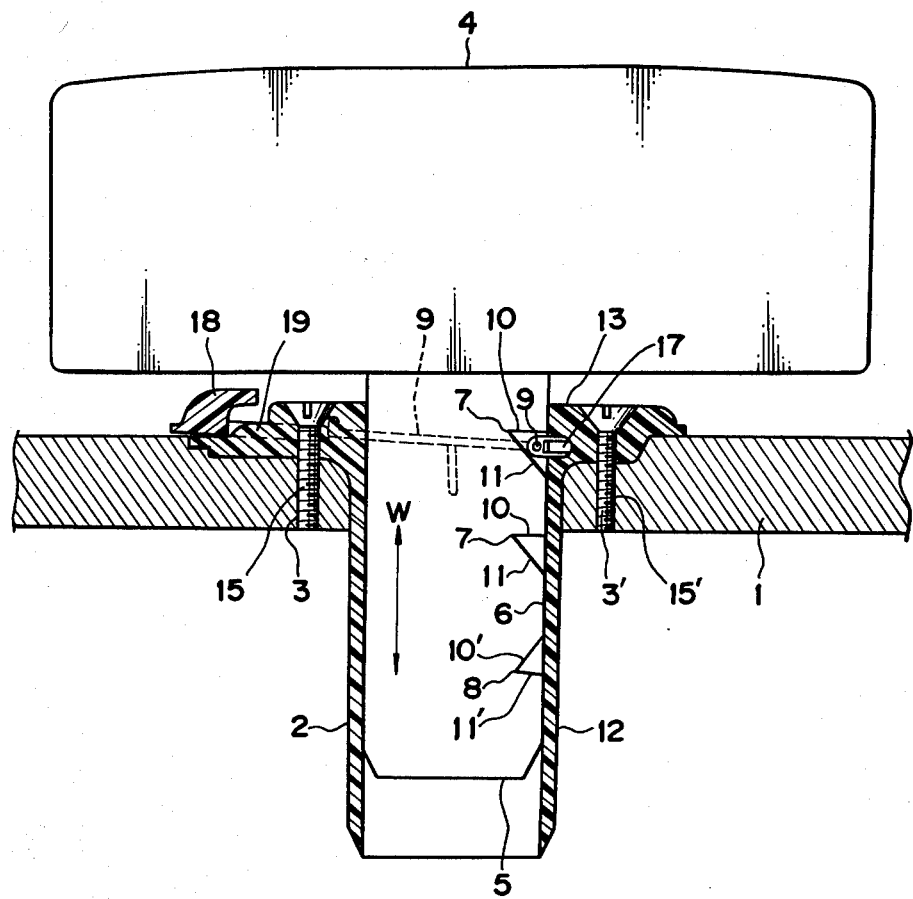
FIG. 1 is a vertical sectional view of the supporting means of a headrest of automotive seat made in accordance with this invention.

In FIG. 1, to the uppermost part of an automotive seat 1, there is fitted by screws 3, 3' a connecting member 2, into which a base member 5 of a headrest 4 is insertedly fitted. Said base member has at circumferential wall a plurality of recesses 7, 7, 8 which are spaced from each other with a predetermined distance therebetween along the longitudinal axis of the base member. The selected one of the recesses engages with the connecting hollow member 2 through detent means 9, for fixing the elevation of the headrest with respect to the seat. The upper surface 10 of the recess 7 is cut at a right angle with respect to the slidable direction W of the base member, while its lower surface 11, is made to slant. With this construction, even when the headrest 4 is forcibly pressed downwardly (for example when a driver's head is vigorously accelerated rearwardly by an accidental shock), the headrest can keep its position on account of the firm engagement of the base member 5, more particularly its flat inner upper surface 10 of recess 7 with the hollow member through the detent 9. On the other hand, the headrest 4 can easily be lifted upwardly, since the engagement of the detent 9 with the lower slant surface 11 of recess 7 is readily releasable by applying to the headrest an upwardly acting force. As shown in FIG. 1, the lowermost recess 8 is provided specifically with a slanting upper surface 10', and its lower surfce 11' is made at a right angle with respect to the aforementioned direction W. Under this construction, when the headrest 4 is pressed downwardly, it can readily come downwardly since the engagement of detent 9 with the slant upper surface 10' is released on the instant thereby, whereas even when the headrest is lifted by force, it shall not come out from the hollow member 2 because the engagement of detent 9 with the lower surface 11' of recess 8 is not releasable thereby.

More detailed constructions of the connecting hollow member 2 are described hereinunder, with reference to FIGS. 2 to 8.

Figure 2:
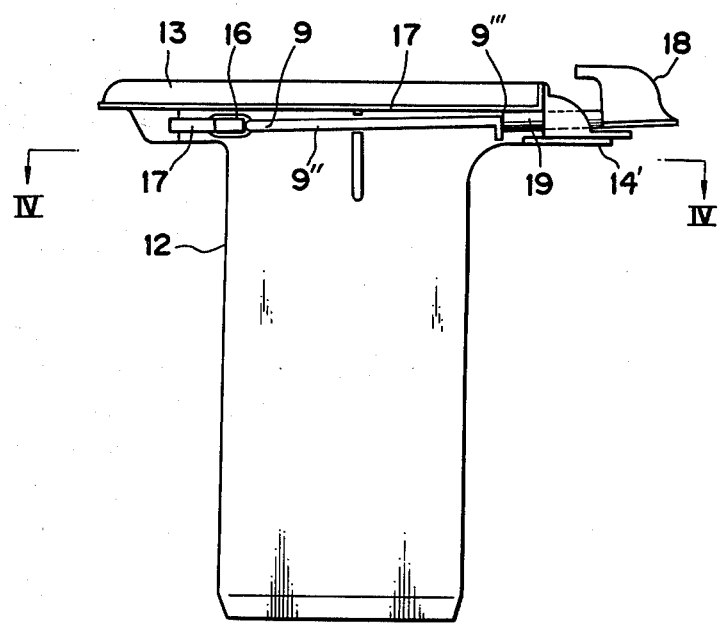
FIG. 2 is a side view thereof.
Figure 3:
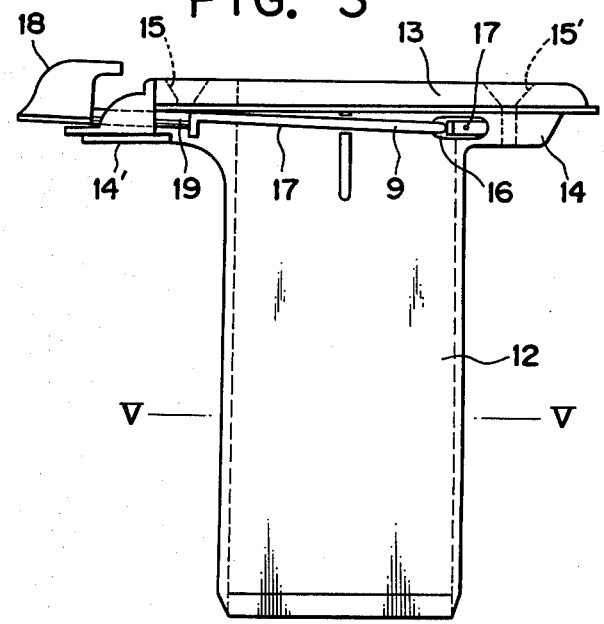
FIG. 3 is a rear view thereof.
Figure 4:
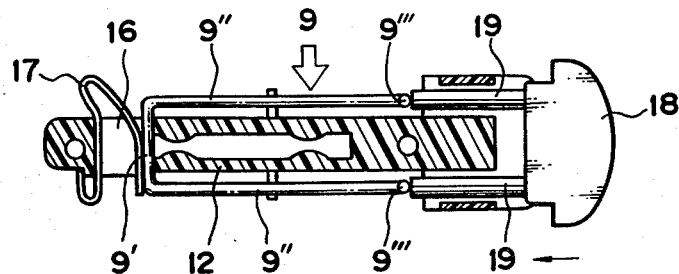
FIG. 4 is a sectional view of the means taken along the line IV—IV of FIG. 2.
Figure 5:
FIG. 5 is a view similar to FIG. 4 in which the section is taken along the line V—V of FIG. 3.
Figure 6:
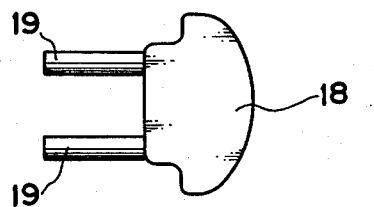
FIG. 6 is a plan view of a push button employed in the means.
Figure 7:
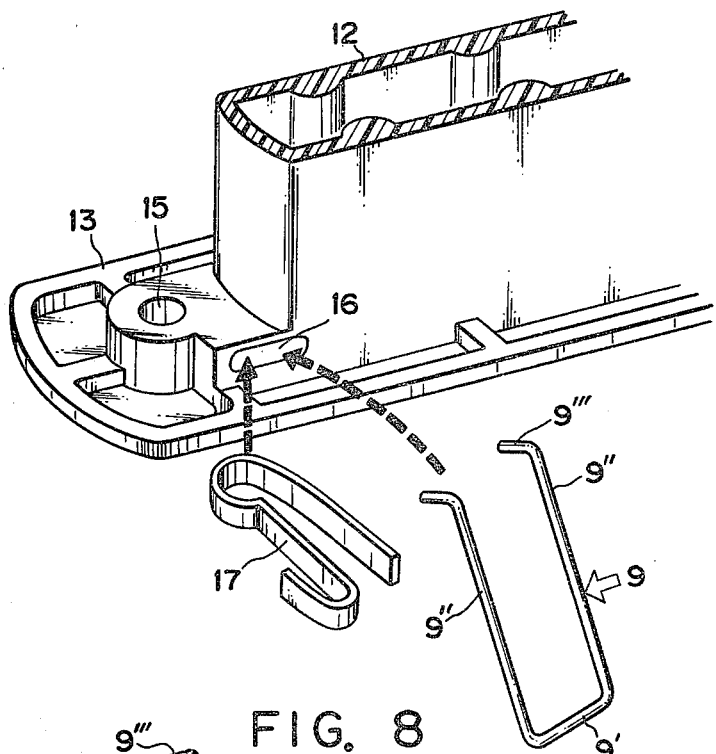
FIGS. 7 and 8 are explanatory views for the assembly of the means.
Figure 8:
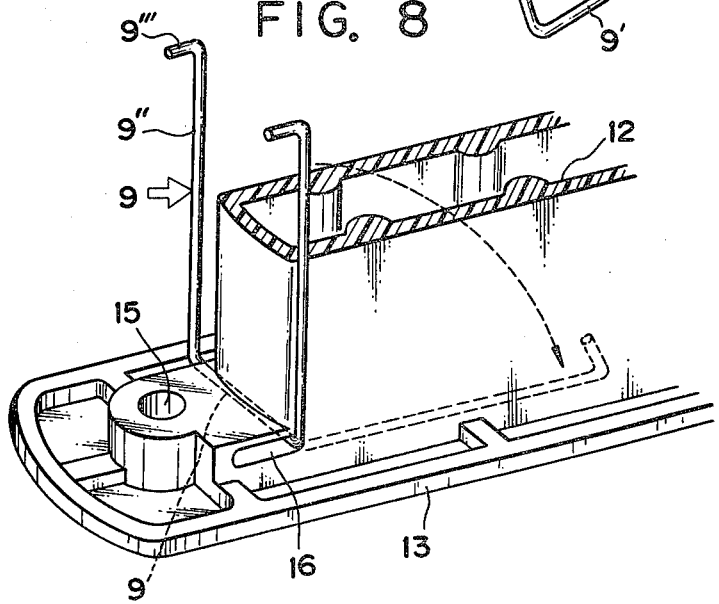

The hollow member 2 consists of a vertically extending hollow main body 12 made from synthetic resins, and a flange 13 which is formed at and circumferentially to the upper end of the body 12. This main body 12 has a cross section of a rectangular shape, as best shown in FIG. 5. The flange 13 extends further outwardly to form extensions 14, 14', to which there are provided holes 15, 15'. These holes receive the aforementioned screws 3, 3'. To one of the extensions 14, 14' (to the extension 14 in case of the embodiment shown in the drawing), there is provided an elongated slot opening 16 in which the detent 9 is insertedly mounted. This opening runs transversely to the axis of the hollow member 2 and its flange 13, and has a window opening to the inner hollow space of the member 2 at a position corresponding to the row of recesses 7, 8. Thus, the detent 9 supported by the slot opening 16 is engageable with the selected one of the recesses 7, 8 when it is biased toward the base member 5 of the headrest. As best shown in FIG. 4, the detent 9, configuration of which is generally a U-shape consists of a base portion 9' which is movably supported within the slot opening and engageable with one of the recesses 7, 8, and bifurcations 9'', 9'' which are made so as to extend outwardly and transversely to the hollow main body 12. Free ends of the bifurcations are bent either upwardly or downwardly to form bends 9''', 9'''. As the bifurcations run closely under the inner surface of the flange 13 as shown in FIGS. 2 and 3, they do not disturb the intimate fitting of the hollow member 2 to the seat 1, particularly to its upper end surface. The detent 9 having the above-explained constructions is assembled to the hollow main body 12, as illustrated in FIGS. 7 and 8. To wit, first of all, as shown in FIG. 7, an end of one of the bifurcations 9'' is passed through the slot opening 16 so as to make the base portion 9' located within the slot path. Then, as shown in FIG. 8, the detent as a whole is turned clockwise so as to have the bifurcations run underneath the flange 13. The detent 9 which is thus supported at its base portion 9' by the slot opening 16, is shifted within the slot and toward the main body 12, and springs 17 is inserted in a space formed between the base portion 9' and the rear wall of slot 16, whereby the base portion is biased resiliently toward the base member 5 of headrest. Now, the detent 9 is resiliently engageable at its base portion with one of the recesses 7, 8. Numeral 18 indicates a push button for releasing, when desired, the engagement of the detent 9 with the recesses 7, 8, which is removably accommodated to the extension 14'. Free ends of bifurcated legs 19, 19 of the button 19 abut against the bends 9''', 9''', while this abutment brings about the release of the engagement of the detent with one of the recesses when the button is pushed from its normal position toward the extension 14.

The means for supporting a headrest of automotive seat of this invention having the above-described constructions can advantageously overcome such drawbacks of conventional devices as described hereinbefore.

I claim:

1. Means for removably connecting and vertically adjustably supporting a head rest to an automotive seat which comprises:

a vertically extending hollow member provided with a slot opening and a flange which extends transversely to and outwardly from an upper part of said hollow member, the lower part of the member being within the automotive seat and the flange being mounted substantially over the upper end of the automotive seat;

a base member provided to the headrest and slidably received by the vertically extending hollow member, the base member having a row of recesses along the longitudinal axis thereof and with predetermined distances therebetween and each of the recesses having a surface of a right angle with respect to the said longitudinal axis, the lowermost recess of the base member having a lower surface of a right angle with respect to the longitudinal axis thereof, and other recesses having upper surfaces of a right angle with respect to the longitudinal axis;

detent means of a U-shape operable to resiliently engage with the selected one of the recesses, and provided with a base portion and bifurcations extending from said base portion, said base portion abutting against the one of the recesses through the aforementioned slot opening of the hollow member and said bifurcations extending outwardly from the hollow member, closely under the flange of said hollow member, and transversely to the longitudinal axis of the hollow member;

spring means removably accommodated to the flange of said hollow member and resiliently biasing the detent means toward the base member of the headrest, and pushing means removably supported by the flange of the hollow member and having bifurcations, the ends of which abut against the bifurcations of the detent means and operable when actuated to disconnect the engagement of the base portion of the detent means with the base member of the headrest.

* * * * *